Sept. 12, 1967 MATAMI YASUFUKU ETAL 3,341,379
METHOD OF MANUFACTURE OF SILICON TRANSISTOR
Filed Dec. 14, 1964 2 Sheets-Sheet 1

METHOD OF MANUFACTURE OF SILICON TRANSISTOR

Filed Dec. 14, 1964

United States Patent Office 3,341,379
Patented Sept. 12, 1967

3,341,379
METHOD OF MANUFACTURE OF SILICON TRANSISTOR

Matami Yasufuku, Yokohama-shi, Toyosaku Kawamura, Kanagawa-ken, Yoshihiro Matsumoto, Tokyo, and Atsuo Kuramochi, Kawasaki-shi, Japan, assignors to Fujitsu Limited, Kawasaki, Japan, a corporation of Japan Filed Dec. 14, 1964, Ser. No. 418,349
Claims priority, application Japan, Dec. 14, 1963, 38/67,292
4 Claims. (Cl. 148—187)

ABSTRACT OF THE DISCLOSURE

A mesa transistor is manufactured by providing a first layer of determined conductivity type semiconductor material. A second layer of opposite conductivity type semiconductor material is provided on the first layer. The second layer is covered with an oxide layer. A zone of the determined conductivity type is provided in the second layer. The oxide layer is removed from the second layer except for an area covering the zone of determined conductivity type. The remaining oxide layer and the area of the second layer substantially circumferential to the remaining oxide layer are covered with a material which does not respond to etchant to retain the remaining oxide layer for the life of the transistor. The layers are then etched with an etchant to form a mesa configuration.

The present invention relates to a method of manufacture of a silicon transistor. More particularly, the invention relates to a method of manufacture of a silicon transistor which provides the characteristics of planar and mesa type transistors.

Each of the mesa type and the planar type of silicon transistors has advantages and disadvantages. In the mesa type transistor, the emitter-base junction is not covered by an oxide layer and is therefore susceptible to surface contamination. Furthermore, the emitter and base electrode areas are limited. When the emitter electrode is provided by the mask evaporation method, the precise positioning of the mask is difficult. If the electrode is provided by a photographic method utilizing photosensitive protective film, the electrode material and the photosensitive protective film remain on the emitter-base junction. This weakens the emitter-base junction and lowers the yield of the transistor. This is particularly likely to occur in power transistors.

In the planar type transistor, it is very difficult to provide a collector-base junction of high breakdown voltage and high yield. It is not difficult to provide a mesa type transistor collector-base junction having a breakdown voltage of several hundred volts although it is very difficult to provide a planar type transistor collector-base junction having a breakdown voltage of more than one-hundred volts.

Figure 3A:
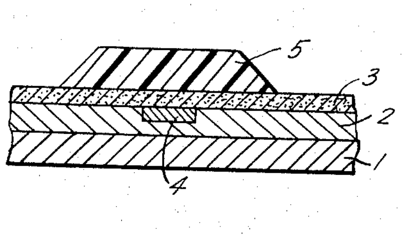
Figure 4A:
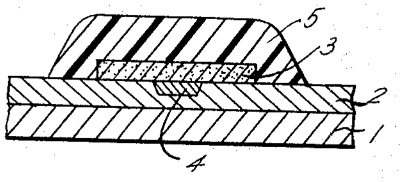
Figure 3B:
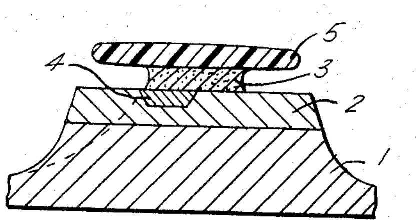
Figure 4B:
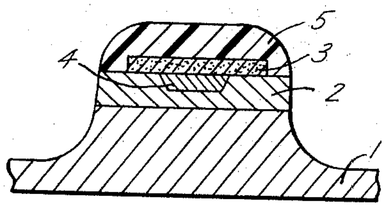

In order that the present invention may be readily carried into effect, it will now be described with reference to the accompanying drawings, wherein:

FIGS. 1*a*, 1*b*, 1*c*, 1*d*, 1*e*, 1*f* and 1*g* illustrate a prior art method of manufacture of a silicon transistor;

FIGS. 2*a*, 2*b*, 2*c*, 2*d*, 2*e*, 2*f* and 2*g* illustrate the method of the present invention for the manufacture of a silicon transistor;

FIGS. 3*a* and 3*b* illustrate a prior art method of manufacture of a silicon transistor; and FIGS. 4*a* and 4*b* illustrate the method of the present invention for the manufacture of a silicon transistor.

FIGS. 1*a* to 1*g* and 3*a* and 3*b* illustrate a prior art method of manufacture of a silicon transistor of the mesa type and FIGS. 2*a* to 2*g* and 4*a* and 4*b* illustrate the corresponding steps of the method of manufacture of the present invention.

Figure 1A:
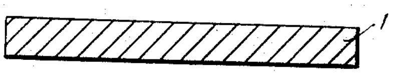
PRIOR ART FIG. 1a
Figure 2A:
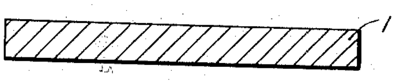
Figure 1B:
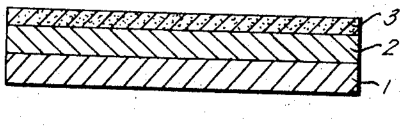
Figure 1C:
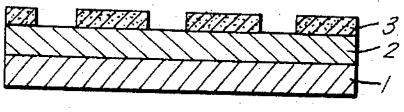
Figure 2C:
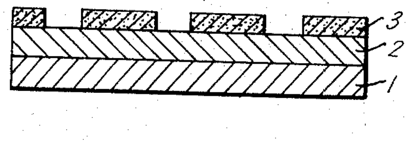
Figure 1D:
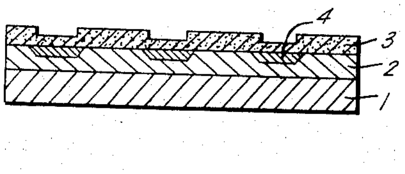
Figure 1F:
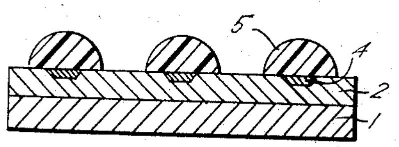
PRIOR ART FIG. 1f
Figure 2F:
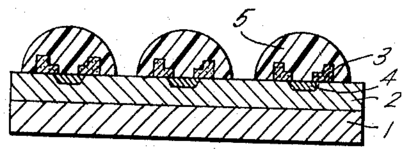
Figure 1G:
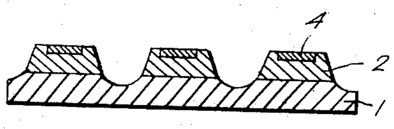

In the method of the prior art, a silicon wafer 1 (FIG. 1*a*) is provided. The base area 2 is provided by base diffusion on the silicon wafer 1 (FIG. 1*b*) and an oxide layer 3 is provided on the base area or layer 2 (FIG. 1*b*). The parts of the oxide layer 3 which are to form the emitter areas or zones are removed (FIG. 1*c*). The emitter areas 4 are provided by emitter diffusion (FIG. 1*d*). The remainder of the oxide layer 3 is then removed (FIG. 1*e*) and wax 5 is positioned over the emitter areas 4 (FIG. 1*f*). The unit is then etched and the mesas are produced (FIG. 1*g*). Thus, an electrode metal may be provided between the emitter area 4 and the base area 2, and a lead wire connected to the electrode metal completes the transistor.

Figure 2B:
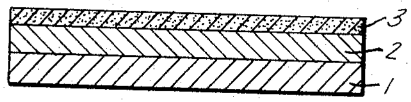

In the method of the present invention, a silicon wafer 1 (FIG. 2*a*) is provided. The transistor is of the NPN type and the thickness of the silicon wafer 1 is about 200 microns; the wafer being polished. The base layer or area 2 is provided by base diffusion on the silicon wafer 1 (FIG. 2*b*) and an oxide layer 3 is provided on the base area or layer 2 (FIG. 2*b*). The P-type base layer 2 is provided by the addition of boron impurities and heating in a diffusion furnace. Liquid oxygen is passed over the unit in the diffusion furnace to provide the oxide layer 3. The thickness of the oxide layer 3 is about 5000 to 8000 A. The heating is continued until the P-type base layer 2 is diffused to a desirable depth.

The parts of the oxide layer 3 which are to form the emitter areas or zones are removed (FIG. 2*c*) by a photographic process. The photographic process is performed in a manner whereby a photoresistant material is coated on the oxide layer 3 and a negative mask is positioned on the photoresistant material. The mask covers the photoresistant material except for the emitter pattern, which is exposed to ultraviolet light. The photoresistant material of the unsensitized parts is then removed, as by washing, and the remaining photoresistive material is then exposed; the oxide layer is removed and the developed photoresistant material is then removed, as by washing.

Figure 2D:
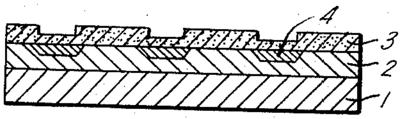
Figure 1E:
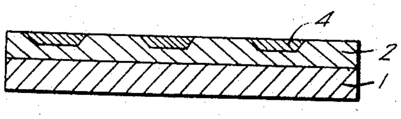

The N-type emitter areas 4 are provided by emitter diffusion (FIG. 2*d*). The N-type emitter zones 4 are provided by depositing phosphorus impurities on the surface areas where the oxide layer 3 has been removed to form the emitter areas (FIG. 2*d*). The unit is then heated in a furnace through which liquid oxygen is passed and the N-type emitter zones 4 are diffused to a desirable depth.

Figure 2E:
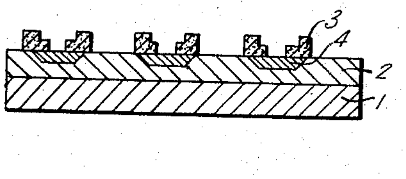

A new oxide layer 3 is then provided on the emitter zones 4 from which the initial oxide layer 3 has been removed (FIG. 2*e*). The oxide layer 3 on the emitter zones 4 is about 4000 to 5000 A. in thickness. The oxide layer 3 on the electrode attaching parts, the mesa etching parts and the circumferential areas around these parts is then removed (FIG. 2*e*). This may be achieved by a photographic process similar to that utilized in the initial preparation of the emitter zones.

Figure 2G:
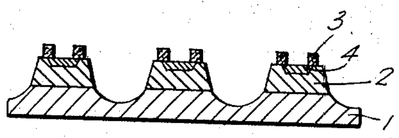

Wax 5 is then positioned over the emitter areas 4 (FIG. 2*f*) and the unit is etched and the mesas are produced (FIG. 2*g*). The electrodes may then be affixed to the unit to complete it. Thus, an electrode metal may be provided between the emitter area 4 and the base area 2, and a lead wire connected to the electrode metal completes the transistor.

In the method of manufacture of the present invention it is necessary to remove the oxide layer from the circumferential area of the part which is to be formed into the mesa by etching. The necessity and results are illustrated in FIGS. 3*a* and 3*b* and in FIGS. 4*a* and 4*b*. If the oxide layer 3 is retained, as illustrated in FIG. 3*a*, the prior art method provides an undesirable result, due to he fact that the etchant reacts more rapidly with the oxide layer than with the other materials it contacts. The oxide layer 3 is thus etched most rapidly during the mesa etching and undermines the wax 5, as indicated in FIG. 3*b*, causing said wax to float. Furthermore, the emitter areas 4 are also etched by the etchant.

In the method of manufacture of the present invention, however, the oxide layer 3 over the emitter zone 4, as illustrated in FIG. 4*a*, is retained and only the oxide layer in the circumferential area around the mesa is removed before the wax 5 is applied. The wax 5 thus adheres directly to the silicon 2 itself without the intervention of an oxide layer, in the circumferential area of the mesa. Normal mesa etching may then be performed.

The method of manufacture of the present invention provides a transistor having the following advantages. The lowering of base surface density by final surface treatment, that is, an increase in base diffusion resistance and disproportion between materials are prevented. This permits surface treatment of the unit, and the exposed junction part of the transistor may be kept cleaner than that of known mesa transistors. Since the emitter-base junction is covered by an oxide layer, a short-circuit between the emitter and the base at the time of bonding of the electrode is essentially eliminated. Such short-circuiting is common in prior art units. Accordingly, the breakdown voltage of the emitter-base junction is high and the yield is high.

Furthermore, in a transistor provided by the method of manufacture of the present invention, since the surface recombination rate near the emitter zone is kept small by the influence of the oxide layer, the current amplification rate is large and the leakage current and noise are small in small current areas. The lowering of the breakdown voltage due to accumulation of impurities, curvature of the junction and locally improper diffusion are prevented and the collector breakdown voltage is high and of high yield.

While the invention has been described by means of specific examples and in a specific embodiment, we do not wish to be limited thereto, for obvious modifications will occur to those skilled in the art without departing from the spirit and scope of the invention.

We claim:

1. A method of manufacture of a mesa transistor, comprising the steps of providing a first layer of determined conductivity type semiconductor material;

providing a second layer of opposite conductivity type semiconductor material on said first layer;

covering the second layer with an oxide layer;

providing a zone of said determined conductivity type in said second layer;

removing the oxide layer from said second layer except for an area covering said zone of determined conductivity type;

covering the remaining oxide layer and the area of said second layer substantially circumferential to said remaining oxide layer with a material which does not respond to etchant thereby retaining said remaining oxide layer for the life of said mesa transistor; and etching said layers with an etchant to form a mesa configuration.

2. A method of manufacture of a mesa transistor, comprising the steps of providing a first layer of silicon of determined conductivity type;

providing a second layer of opposite conductivity type on said first layer;

covering the second layer with an oxide layer;

providing a zone of said determined conductivity type in said second layer;

removing the oxide layer from said second layer except for an area covering said zone of determined conductivity type;

covering the remaining oxide layer and the area of said second layer substantially circumferential to said remaining oxide layer with a material which does not respond to etchant thereby retaining said remaining oxide layer for the life of said mesa transistor; and etching said layers with an etchant to form a mesa configuration.

3. A method of manufacture of a mesa transistor, comprising the steps of providing a first layer of silicon of determined conductivity type;

providing a second layer of opposite conductivity type on said first layer;

covering the second layer with an oxide layer;

providing a zone of said determined conductivity type in said second layer;

removing the oxide layer from said second layer except for an area covering said zone of determined conductivity type;

covering the remaining oxide layer and the area of said second layer substantially circumferential to said remaining oxide layer with wax thereby retaining said remaining oxide layer for the life of said mesa transistor; and etching said layers with an etchant to form a mesa configuration.

4. A method of manufacture of a mesa transistor, comprising the steps of providing a first layer of N conductivity type silicon;

providing a second layer of P conductivity type on said first layer;

covering the second layer with an oxide layer;

providing an N conductivity type zone in said second layer;

removing the oxide layer from said second layer except for an area covering said N conductivity type zone;

covering the remaining oxide layer and the area of said second layer substantially circumferential to said remaining oxide layer with wax thereby retaining said remaining oxide layer for the life of said mesa transistor; and etching said layers with an etchant to form a mesa configuration.

References Cited

UNITED STATES PATENTS

| | | | |
|---|---|---|---|
| 3,147,152 | 9/1964 | Mendel. | |
| 3,152,928 | 10/1964 | Hubner | 148—33.5 |
| 3,193,418 | 7/1965 | Cooper | 148—187 |

HYLAND BIZOT, *Primary Examiner.*